United States Patent
Geng

(10) Patent No.: US 11,727,708 B2
(45) Date of Patent: Aug. 15, 2023

(54) SECTIONIZING DOCUMENTS BASED ON VISUAL AND LANGUAGE MODELS

(71) Applicant: Ciitizen, LLC, San Francisco, CA (US)

(72) Inventor: Kunling Geng, Milpitas, CA (US)

(73) Assignee: Ciitizen, LLC, San Francisco, CA (US)

(*) Notice: Subject to any disclaimer, the term of this patent is extended or adjusted under 35 U.S.C. 154(b) by 0 days.

(21) Appl. No.: 17/711,596

(22) Filed: Apr. 1, 2022

(65) Prior Publication Data
US 2022/0230465 A1 Jul. 21, 2022

Related U.S. Application Data

(63) Continuation of application No. 16/702,394, filed on Dec. 3, 2019, now Pat. No. 11,321,956.

(51) Int. Cl.
| | | |
|---|---|---|
| G06F 17/00 | (2019.01) | |
| G06V 30/416 | (2022.01) | |
| G06F 40/258 | (2020.01) | |
| G06F 40/30 | (2020.01) | |
| G06V 30/414 | (2022.01) | |
| G06V 30/10 | (2022.01) | |

(52) U.S. Cl.
CPC .......... *G06V 30/416* (2022.01); *G06F 40/258* (2020.01); *G06F 40/30* (2020.01); *G06V 30/10* (2022.01); *G06V 30/414* (2022.01)

(58) Field of Classification Search
CPC .... G06V 30/416; G06V 30/414; G06V 30/10; G06F 40/258; G06F 40/30; G06F 40/106
See application file for complete search history.

(56) References Cited

U.S. PATENT DOCUMENTS

| | | | |
|---|---|---|---|
| 5,669,007 A | 9/1997 | Tateishi | |
| 5,784,487 A | 7/1998 | Cooperman | |
| 8,577,826 B2 * | 11/2013 | Berard | G06F 40/258 |
| | | | 706/47 |
| 9,116,890 B2 | 8/2015 | King et al. | |
| 10,049,270 B1 * | 8/2018 | Agarwalla | G06V 10/26 |
| 10,395,772 B1 * | 8/2019 | Lucas | G06V 30/418 |
| 11,200,412 B2 * | 12/2021 | Tripathi | G06V 30/414 |
| 2007/0263930 A1 | 11/2007 | Ito | |
| 2010/0299135 A1 | 11/2010 | Fritsch et al. | |
| 2015/0088888 A1 | 3/2015 | Brennan et al. | |
| 2015/0363382 A1 | 12/2015 | Bohra et al. | |

(Continued)

*Primary Examiner* — Laurie A Ries
(74) *Attorney, Agent, or Firm* — Sterne, Kessler, Goldstein & Fox P.L.L.C.

(57) ABSTRACT

Some embodiments provide a program that receives a request to sectionize a document, uses a visual model to identify a set of candidate section headers in the document, and uses a language model to determine a type of section header for at least one candidate section header in the set of candidate section headers in the document. Some embodiments provide a program that receives a request to anonymize data in a document, uses a visual model to identify a set of candidate confidential sections in the document that are each predicted to include a collection of confidential data, uses a language model to identify terms in each candidate confidential section that are determined to be confidential data, analyzes the document to identify a set of terms in the document based on the identified terms in the set of candidate confidential sections, and redacts the set of terms in the document.

21 Claims, 14 Drawing Sheets

(56) References Cited

U.S. PATENT DOCUMENTS

| | | |
|---|---|---|
| 2017/0277668 A1 | 9/2017 | Luo et al. |
| 2017/0344821 A1 | 11/2017 | Gaskill et al. |
| 2019/0019020 A1 | 1/2019 | Flament et al. |
| 2019/0050683 A1* | 2/2019 | Gupta Hyde ...... G06V 10/7747 |
| 2019/0180098 A1 | 6/2019 | Carpenter et al. |
| 2019/0361860 A1* | 11/2019 | Rogynskyy ............... G06F 7/14 |
| 2020/0042837 A1* | 2/2020 | Skinner ............... G06F 21/6245 |
| 2020/0134024 A1* | 4/2020 | Banisakher ............ G06N 20/00 |
| 2020/0334381 A1 | 10/2020 | Yarowsky et al. |
| 2020/0372075 A1 | 11/2020 | Rogynskyy et al. |
| 2020/0402625 A1* | 12/2020 | Aravamudan .......... G06F 21/64 |
| 2021/0004432 A1* | 1/2021 | Li ........................... G06F 40/30 |
| 2021/0064698 A1 | 3/2021 | Simanovich et al. |
| 2021/0110153 A1* | 4/2021 | Gupta .................. G06F 16/906 |

* cited by examiner

300

Service:

Chief Complaint:

Visit Details:

Preferred Language:

Interval History

Medications:

Allergies:

Oncology History:

FIG. 3

405 — Service:

410 — Chief Complaint:

415 — Visit Details:

420 — Preferred Language:

425 — Interval History

430 — Medications:

435 — Allergies:

440 — Oncology History:

Medications:
medication
current medication
prescription
[ner_med]

Vitals:
vital
vital sign

Allergies:
allergy
allergic reaction
sensitivity

Diagnoses:
diagnosis
disease

Demographics:
patient demographic
patient ethnicity race

405 — Service: → Null, Null, Null

410 — Chief Complaint: → Null, Null, Null

415 — Visit Details: → Null, Null, Null

420 — Preferred Language: → demographics, 0.86, embeddings matcher

425 — Interval History: → Null, Null, Null

430 — Medications: → medications, 0.99, exact text matcher

435 — Allergies: → allergies, 0.97, exact text matcher

440 — Oncology History: → history of illness, 0.83, embeddings matcher

Final Report – 09/18/15

Physician: John Smith, MD
Ph: 300-718-4314
Client: ACME University

Patient Name: Jane Doe
Accession #: 15-269813
Birth Date: 03/02/75
Gender: F
MRN #: 56559873
Authorized: 08/14/2015
Ethnicity: Asian

Summary:
Jane ▨▨▨▨▨▨▨▨▨▨▨▨▨▨▨▨▨▨▨▨▨▨
▨▨▨▨▨▨▨▨▨▨▨▨▨▨▨▨▨▨▨▨▨▨▨▨
▨▨▨▨ Mrs. Doe ▨▨▨▨▨▨▨▨▨▨▨▨▨
▨▨▨▨▨▨▨▨▨▨▨▨▨▨▨▨▨▨

Test Results:
▨▨▨▨▨▨▨▨▨▨▨▨▨▨▨▨▨▨▨▨▨▨▨▨
▨▨▨▨▨▨▨▨▨▨ Mrs. Doe ▨▨▨▨▨▨▨
▨▨▨▨▨▨▨▨▨▨▨▨▨▨▨▨▨▨▨▨▨▨▨▨
▨▨▨▨▨▨▨▨▨▨▨▨▨▨▨▨▨▨▨▨▨▨▨▨
▨▨▨▨▨▨▨▨▨▨▨▨▨▨▨▨ Mrs. Doe ▨▨
▨▨▨▨▨▨▨▨▨▨▨▨▨▨

FIG. 8

Final Report – 09/18/15

Physician: John Smith, MD
Ph: 300-718-4314
Client: ACME University

Patient Name: Jane Doe — 805
Accession #: 15-269813
Birth Date: 03/02/75
Gender: F
MRN #: 56559873
Authorized: 08/14/2015
Ethnicity: Asian

Summary:
Jane ▓▓▓▓▓▓▓▓▓▓▓▓▓▓▓▓▓▓▓▓▓▓▓▓▓▓▓▓▓▓▓▓▓▓▓▓▓▓▓▓▓
▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓
▓▓▓▓▓▓ Mrs. Doe ▓▓▓▓▓▓▓▓▓▓▓▓▓▓▓▓▓▓▓▓▓▓▓▓▓▓▓▓▓▓
▓▓▓▓▓▓▓▓▓▓▓▓▓▓▓▓▓▓▓▓▓▓▓▓▓▓▓▓▓▓▓▓▓▓▓▓▓▓▓▓▓▓▓▓

Test Results:
▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓
▓▓▓▓▓▓▓▓▓▓▓▓ Mrs. Doe ▓▓▓▓▓▓▓▓▓▓▓▓▓▓▓▓▓▓▓▓▓▓▓▓
▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓▓
▓▓▓▓▓▓▓▓▓▓▓▓▓▓▓▓▓▓▓▓▓▓▓▓▓▓▓▓▓▓▓▓ Mrs. Doe ▓▓▓▓
▓▓▓▓▓▓▓▓▓▓▓▓▓▓▓▓▓▓▓▓

FIG. 9

Final Report – 09/18/15

Physician: John Smith, MD
Ph: 300-718-4314
Client: ACME University

— 805

Summary:

Test Results:

FIG. 10

SECTIONIZING DOCUMENTS BASED ON VISUAL AND LANGUAGE MODELS

CROSS-REFERENCE TO RELATED APPLICATIONS

This application is a continuation of U.S. patent application Ser. No. 16/702,394 filed on Dec. 3, 2019, which is hereby incorporated by reference in its entirety.

BACKGROUND

In fields such as healthcare, finance, law, and so on, electronic (rather than physical) document-based systems have become the standard mechanism for recording/maintaining/archiving information and exchanging that information among parties. Many electronic documents that are stored and managed by these systems comprise a stream of unstructured, natural language data. Accordingly, it is useful to have tools that can identify and classify the semantic content in such electronic documents so that the documents can be computationally processed (e.g., searched, correlated, categorized, etc.) based on their semantic content by automated systems/agents.

One way in which semantic content can be gleaned from an electronic document is via sectionization. As used herein, sectionization refers to the process of automatically identifying sections and sub-sections that are implicit in an electronic document's content (e.g., a top-level paragraph with a section header or title H1, a nested paragraph with a sub-section header H2, etc.) and classifying the sections/sub-sections according to various known section types. This sectionization process typically involves at least two stages: a first stage where possible section/sub-section headers in the electronic document (i.e., "section header candidates") are identified based on the document's visual layout, and a second stage where the section header candidates are validated and classified via an analysis of the section header and/or body text.

Existing implementations for performing the first stage above generally rely on a fixed set of rules that are tuned to work well on specific type(s) of electronic documents that are most commonly provided as input to the sectionization process. For example, assume that the process typically receives electronic documents of type T1 for sectionization and the section headers in most, if not all, documents of type T1 are (1) bolded, (2) have a font size of 20 points, and (3) are horizontally centered. In this scenario, the sectionization process may employ a fixed rule set indicating that all lines of text in an incoming electronic document that satisfies criteria (1), (2), and (3) should be identified as section header candidates while all lines of text that do not satisfy criteria (1), (2), and (3) should not be identified as section header candidates.

However, there are several limitations with this fixed rule-based approach. First, it assumes that all incoming documents will strictly adhere to the fixed rules defined therein and thus is extremely brittle (i.e., intolerant of slight rule deviations). For instance, in the example above, the sectionization process may receive an electronic document of type T1 whose section headers generally conform to criteria (1), (2), and (3), but due to an optical character recognition (OCR) error a few of the document's section headers may be slightly smaller than typical (e.g., have a detected font size of 18 points rather than 20 points). In this case, the sectionization process will not mark the lines of text corresponding to those smaller section headers as section header candidates, even though they are largely similar in appearance to the other section headers in the document.

Second, because the fixed rule-based approach is tuned to work well on specific types of electronic documents whose visual layouts are consistent with the fixed rules (e.g., electronic documents generated and maintained by a particular organization O1), this approach will necessarily work poorly on other types of electronic documents that may include similar semantic content but employ significantly different visual layouts (e.g., electronic documents generated and maintained by another organization O2). As a result, the fixed rule-based approach is poorly suited for implementing section header candidate identification in sectionization services/tools that operate on a variety of electronic document types with differing visual layouts, such as electronic documents originating from different sources.

SUMMARY

In some embodiments, a non-transitory machine-readable medium stores a program executable by at least one processing unit of a device. The program receives a request to sectionize a document. The program further uses a visual model to identify a set of candidate section headers in the document. The program also uses a language model to determine a type of section header for at least one candidate section header in the set of candidate section headers in the document.

In some embodiments, the program may further perform optical character recognition (OCR) operations on the document to identify a set of text in the document; after performing optical character recognition operations on the document, extract the set of text from the document; and convert the document into a set of images. Performing the OCR operations on the document may include using a third-party application to perform the ORC operations on the document. Using the visual model to identify the set of candidate section headers in the document may include providing, as inputs to the visual model, the set of images and the set of text extracted from the document and receiving, as outputs from the visual model, a set of sections in the set of images predicted to be section headers in the document, dimensions of bounding boxes encompassing text in the section headers, locations of the bounding boxes, and confidence scores associated with the section headers.

In some embodiments, using the language model to determine the type of section header for each candidate section header in the set of candidate section headers in the document may include normalizing text in the candidate section header; determining whether the text in the candidate section header matches text specified in a first section header type definition in a set of section header type definitions, wherein each section header type definition in the set of section header type definitions defines a type of section header; and, upon determining that the text in the candidate section header matches the text specified in the first section header type definition, determining the candidate section header as being the type of section header defined by the first section header type definition.

In some embodiments, using the language model to determine the type of section header for each candidate section header in the set of candidate section headers in the document may further include, upon determining that the text in the candidate section header does not match text specified in any section header type definition in the set of section header type definitions, determining whether the text in the candidate section header is similar to text specified in a second section header type definition in the set of section header type definitions; and, upon determining that the text in the candidate section header is similar to text specified in the second section header type definition, determining the candidate section header as being the type of section header defined by the second section header type definition. Determining whether the text in the candidate section header is similar to text specified in a second section header type definition in the set of section header type definitions may include using a fuzzy matching technique to determine whether the text in the candidate section header is similar to text specified in a second section header type definition in the set of section header type definitions.

In some embodiments, using the language model to determine the type of section header for each candidate section header in the set of candidate section headers in the document may further include, upon determining that the text in the candidate section header is not similar to text specified in any section header type definition in the set of section header type definitions, using a named-entity recognizer to determine an entity based on the text in the candidate section header and determining whether the entity matches text specified in a third section header type definition in the set of section header type definitions; and, upon determining that the entity matches text specified in the third section header type definition in the set of section header type definitions, determining the candidate section header as being the type of section header defined by the third section header type definition.

In some embodiments, using the language model to determine the type of section header for each candidate section header in the set of candidate section headers in the document may further include, upon determining that the entity does not match text specified in the third section header type definition in the set of section header type definitions, determining a first embedding for the text in the candidate section header and determining whether the text in the candidate section header is similar to text specified in a fourth section header type definition in the set of section header type definitions based on the first embedding and a second embedding determined for the text specified in the fourth section header type definition; and, upon determining that the text in the candidate section header is similar to text specified in the fourth section header type definition, determining the candidate section header as being the type of section header defined by the fourth section header type definition. Determining whether the text in the candidate section header is similar to text specified in a fourth section header type definition in the set of section header type definitions based on the first embedding and the second embedding may include calculating a vector distance between the first embedding and the second embedding. Calculating the vector distance between the first embedding and the second embedding may include calculating a cosine similarity between the first embedding and the second embedding.

In some embodiments, the program may further determine, by the visual model, a first confidence score for each candidate section header in the set of candidate section headers; determine, by the language model, a second confidence score for each candidate section header in the set of candidate section headers; and, calculate, for each candidate section header in the set of candidate section headers, a total score based on the first confidence score determined for the candidate section header and the second confidence score determined for the candidate section header. Calculating, for each candidate section header in the set of candidate section headers, the total score based on the first confidence score determined for the candidate section header and the second confidence score determined for the candidate section header may include multiplying the first confidence score determined for the candidate section header by the second confidence score determined for the candidate section header.

In some embodiments, the request may specify a document identifier. In response to receiving the request, the program may further retrieve the document from a storage configured to store documents. The document may have the document identifier specified in the request. The visual model may be implemented using a region-based convolutional neural network. The program may further receive a plurality of documents; receive annotations of objects in the documents, each annotation comprising a type of the object and a location of the objects in the documents; perform optical character recognition (OCR) operations on each document in the plurality of documents; convert the plurality of documents into a plurality of images; and train the visual model using the on the plurality of images and the annotations of objects in the documents. Using the visual model to identify the set of candidate section headers in the document may include using the trained visual model to identify the set of candidate section headers in the document. The type of an object in the document may be a section header.

In some embodiments, a system includes a set of processing units and a non-transitory machine-readable medium that stores instructions. The instructions cause at least one processing unit to receive a request to sectionize a document. The instructions further cause the at least one processing unit to use a visual model to identify a set of candidate section headers in the document. The instructions also cause the at least one processing unit to use a language model to determine a type of section header for at least one candidate section header in the set of candidate section headers in the document.

In some embodiments, non-transitory machine-readable medium storing a program executable by at least one processing unit of a device. The program receives a request to anonymize data in a document. The program further uses a visual model to identify a set of candidate confidential sections in the document that are each predicted to include a collection of confidential data. The program also uses a language model to identify terms in each candidate confidential section in the set of candidate confidential sections that are determined to be confidential data. The program further analyzes the document to identify a set of terms in the document based on the identified terms in the set of candidate confidential sections. The program also redacts the set of terms in the document.

The following detailed description and accompanying drawings provide a better understanding of the nature and advantages of various embodiments of the present disclosure.

BRIEF DESCRIPTION OF THE DRAWINGS

FIG. 3 illustrates an example image of a document according to some embodiments.

FIG. 4 illustrates candidate section headers in the example document illustrated in FIG. 3 after being processed by the visual model of the sectionizer illustrated in FIG. 1 according to some embodiments.

FIG. 6 illustrates the example document illustrated in FIG. 4 after being processed by the sectionizer illustrated in FIG. 1 according to some embodiments.

FIG. 8 illustrates an example image of a document according to some embodiments.

FIG. 9 illustrates candidate confidential sections in the example document illustrated in FIG. 8 after being processed by the visual model of the data anonymizer illustrated in FIG. 1 according to some embodiments.

FIG. 10 illustrates the example document illustrated in FIG. 9 after being processed by the data anonymizer illustrated in FIG. 1 according to some embodiments.

DETAILED DESCRIPTION

Figure 1:
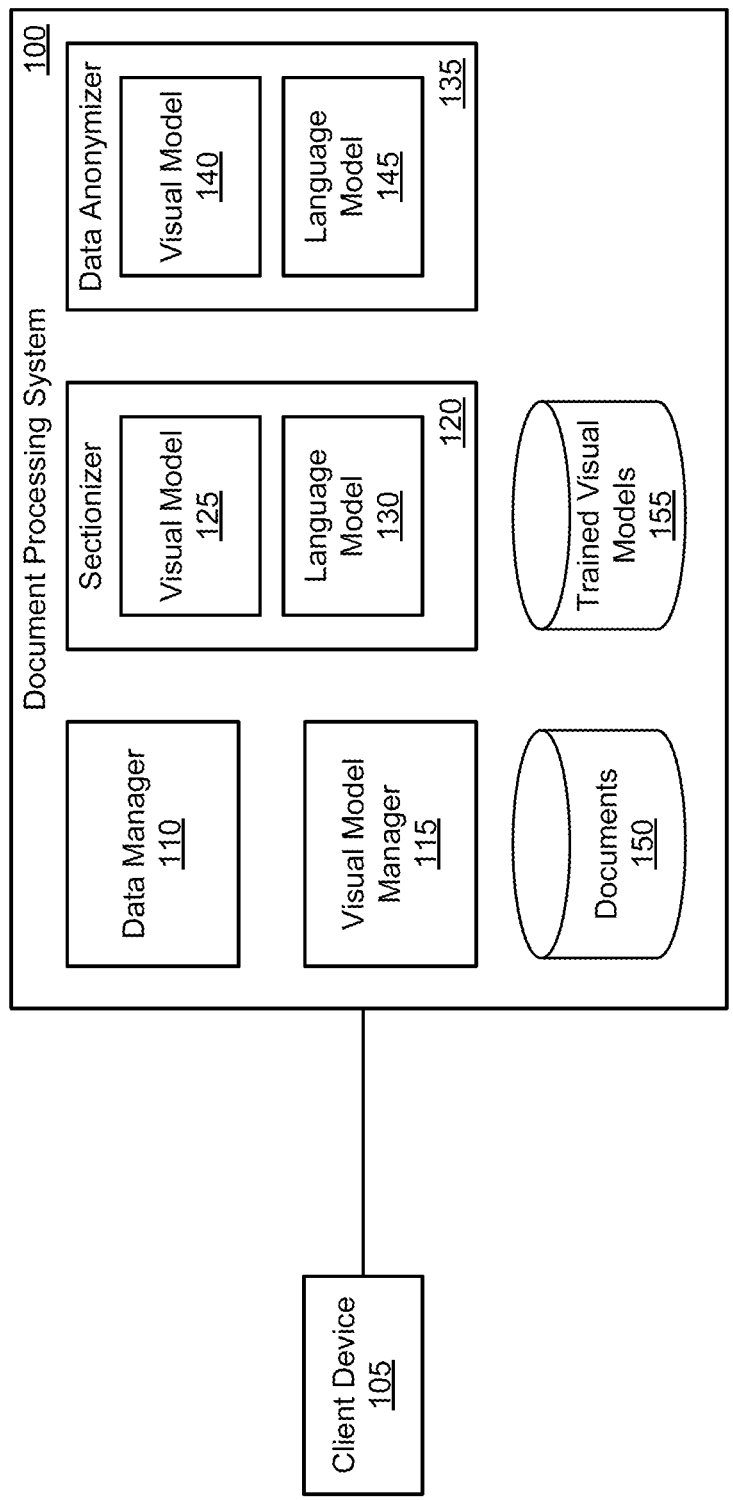
FIG. 1 illustrates a document processing system according to some embodiments.

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

1. Overview

Described herein are techniques for sectionizing documents based on visual and language models. In some embodiments, a document processing system may be configured to process documents in order to identify certain types of section headers in the documents. The document processing system may use a combination of a visual model and a language to identify these types of section headers in documents. For example, the document processing system can train a visual model trained to detect section headers in documents. The document processing system uses such a visual model to detect sections in a document that are predicted to be section headers (also referred to as candidate section headers). Unlike the visual model, the language model used by the document processing system does not require any training. Instead, the language model may include several components that are each configured to utilize a different natural language processing (NLP) technique. The language model uses one or more of these components to process candidate section headers to analyze text in candidate section headers and determine a type of the candidate section headers.

In addition, described herein are techniques for anonymizing data in documents based on visual and language models. In some embodiments, a document processing system may be configured to process documents in order to anonymize confidential data (e.g., name, age, birthdate, ethnicity, etc.) in the documents. The document processing system can use a combination of a visual model and a language to anonymize confidential data in documents. For instance, the document processing system may train a visual model trained to detect sections in documents that are predicted to contain collections of confidential data (also referred to as candidate confidential sections). The language model can be used to identify confidential data within the candidate confidential sections detected by the visual model. Next, the document processing system analyzes the document to identify references to the confidential data in the document based on the confidential data identified in the candidate confidential sections. The document processing system then redacts confidential data identified in the document.

While the examples and embodiments described below are directed to medical data, one of ordinary skill in the art will understand that the techniques described herein are applicable to any discipline that has a specialized and/or relatively narrow vocabulary. For instance, these techniques can be applicable to the oil and gas industry, particular branches of engineering, finance, certain fields of law, etc. Furthermore, the English language is being used for examples and embodiments described below. However, one of ordinary skill in the art will appreciate that these techniques are equally applicable to any number of different languages.

2. Document Processing System Architecture

FIG. 1 illustrates a document processing system 100 according to some embodiments. In some embodiments, document processing system 100 implements the sectionizing and data anonymization techniques described herein. As shown, FIG. 1 illustrates client device 105 and document processing system 100. Client device 105 is configured to communicate and interact with document processing system 100. For example, a user of client device 105 may send documents (e.g., medical documents) to document processing system 100 for processing. A user of client device 105 can also send document processing system 100 requests to view summaries of the data contained in the documents uploaded to document processing system 100, requests to share the data contained in the document, etc. While FIG. 1 shows a single client device 105, one of ordinary skill in the art will recognize that any number of client devices configured to operate the same as or similar to client device 105 may communicate and interact with document processing system 100.

As illustrated in FIG. 1, document processing system 100 includes data manager 110, visual model manager 115, sectionizer 120, data anonymizer 135, documents storage 150, and trained visual models storage 155. Documents storage 150 is configured to store documents and data associated with the documents (e.g., section headers detected in documents, data anonymized in documents, etc.). In some embodiments, each document stored in documents storage 150 has a document identifier (ID) for uniquely identifying the document. Trained visual models storage 155 stores trained visual models (e.g., visual model 125 and visual model 140). In some embodiments, storages 150 and 155 are implemented in a single physical storage while, in other embodiments, storages 150 and 155 may be implemented across several physical storages. While FIG. 1 shows storages 150 and 155 as part of document processing system 100, one of ordinary skill in the art will appreciate that documents storage 150 and/or trained visual models storage 155 may be external to document processing system 100 in some embodiments.

Data manager 110 is responsible for managing documents and data associated with the documents. For example, when document processing system 100 receives a document from client device 105, data manager 110 can generate a document ID for the document, associated the document ID and a user ID associated with the user with the document, and store the document, the document ID, and the user ID in documents storage 150. In some embodiments, the document is stored in documents storage 150 as portable document format (PDF) files. Data manager 110 can perform optical character recognition operations on the document to recognize text in the document. Information associated with the recognized text can be associated with the document and stored in documents storage 150. Information associated with a recognized text in a document may include the recognized text itself (e.g., a string of text) and the dimensions and location of a bounding box encompassing the recognized text in the document. Such information can be stored as a file (e.g., a JavaScript Object Notation (JSON) file).

Data manager 110 also processes documents used to for training visual models. For instance, data manager 110 may receive from visual model manager 115 a request for documents to train a particular visual model. In some embodiments, training documents are documents that have been annotated by a user of client device 105 or the like. In the case of documents used for training visual model 125, a user of client device 105 annotates section headers in the documents. In some cases, the user of client device 105 may also annotate document headers and document footers in the documents. In the case of documents used for training visual model 140, a user of client device 105 annotates sections in the documents that contain collections of confidential data. In response to the request, data manager 110 retrieves from documents storage 150 documents that are annotated for training the particular visual model and the files storing information associated with recognized text in the documents. Next, data manager 110 converts each retrieve document into a set of images. Data manager 110 also converts information associated with recognized text in a document into a set of annotations. In some embodiments, data manager 110 performs such conversion by identifying sections in the document that have been annotated and extracting information associated with the identified sections. The extracted information can include, for each identified section, the type of the identified section (e.g., a section header, a document header, a document footer, a section containing confidential data, etc.) and the dimensions and location in the document of a bounding box encompassing the section. In some embodiments, the extracted information is stored in a file (e.g., a JSON file). Data manager 115 finally sends, for each retrieved document, the set of images and the set of annotations to visual model manager 115.

Additionally, data manager 110 processes requests to sectionize documents. For example, data manager 110 can receive a request to sectionize a document that specifies a user ID and a document ID associated with the document. In response, data manager 110 retrieves from documents storage 150 a document associated with the user ID and the document ID and information associated with recognized text in the document. Next, data manager 110 converts the document into a set of images. Data manager 110 sends sectionizer 120 the set of images and the information associated with recognized text in the document along with a request to identify section headers in the document. In return, data manager 110 receives from sectionizer 120 information associated with detected section headers in the document. Data manager 110 associates the information with the document and stores the information in documents storage 150.

Data manager 110 can process requests to anonymize data in documents. For instance, data manager 110 may receive a request to anonymize data in a document that specifies a user ID and a document ID associated with the document. In response to such a request, data manager 110 retrieves from documents storage 150 a document associated with the user ID and the document ID and information associated with recognized text in the document. Data manager 110 then converts the document into a set of images and sends data anonymizer 135 the set of images and the information associated with recognized text in the document as well as a request to anonymize the data in the document. Data manager 110 may receive from data anonymizer 135 the document with confidential data redacted from the document. Data manager 110 associates the redacted version of the document with the document and stores the redacted version in documents storage 150.

Visual model manager 115 is configured to train visual models. For example, visual model manager 115 can train visual models for sectionizer 120 and data anonymizer 135. To train a visual model, visual model manager 115 sends data manager 110 a request for training data for training a particular visual model. For training a visual model for sectionizer 120, visual model manager 115 request data based on documents with section headers annotated. For training a visual model for data anonymizer 135, visual model manager 115 request data based on documents with section containing confidential data annotated. In response to the request, visual model manager 115 receives from data manager 110 sets of images of documents and sets of annotations associated with the documents. Next, visual model manager 115 generates the visual model and uses the sets of images of documents and the sets of annotations associated with the documents as input for training the visual model. In some embodiments, a visual model may be implemented using a region-based convolutional neural network (CNN). Examples of such CNNs include a region CNN (R-CNN), a fast R-CNN, a faster R-CNN, etc. In other embodiments, a visual model may be implemented using an object detection system (e.g., a you look only once (YOLO) object detection system). Once the visual model is trained, visual model manager 115 stores the trained visual model in trained visual models storage 155.

3. Sectionizer

Sectionizer 120 is responsible for identifying section headers in documents. As shown in FIG. 1, sectionizer 120 includes visual model 125 and language model 130. Visual model 125 is a visual model configured to detect candidate section headers in documents that sectionizer 120 retrieves from trained visual models storage 155. When sectionizer 120 receives from data manager 110 a request to identify section headers in the document, a set of images of the document, and information associated with recognized text in the document, sectionizer 120 provides, as input to visual model 125, the set of images. Based on the set of images, visual model 125 determines, as output, a set of sections in the document that are predicted to be section headers in the document. For each determined section, visual model 125 determines the dimensions and location of the section in the document, the type of the section as being a section header, and a confidence score of prediction. Visual model 125 sends the set of candidate section headers (e.g., the dimensions and locations of the detected sections in the document, the type of the sections, and the recognized text in the sections) to language model 130 for further processing.

FIG. 3 illustrates an example image 300 of a document according to some embodiments. In particular, image 300 will be used an example of an image of a document that sectionizer 120 processes to identify section headers in the document. As shown, image 300 of the document includes several sections headers. Specifically, image 300 includes a "Service:" section header, a "Chief Complaint:" section header, a "Visit Details:" section header, a "Preferred Language:" section header, an "Interval History:" section header, a "Medications:" section header, an "Allergies:" section header, and an "Oncology History:" section header.

For this example, sectionizer 120 receives from data manager 110 a request to identify section headers in a document, image 300 of the document, and information associated with recognized text in the document. The information associated with recognized text in the document includes the recognized text itself (e.g., a string of text) and the dimensions and location of a bounding box encompassing the recognized text in the document. In this example, the information associated with recognized text in the document includes the dimensions and locations of a bounding box encompassing the "Service:" section header, a bounding box encompassing subsection of the "Service:" section, a bounding box encompassing the "Chief Complaint:" section header, a bounding box encompassing subsection of the "Chief Complaint:" section, a bounding box encompassing the "Visit Details:" section header, a bounding box encompassing subsection of the "Visit Details:" section, a bounding box encompassing the "Preferred Language:" section header, a bounding box encompassing subsection of the "Preferred Language:" section, a bounding box encompassing the "Interval History:" section header, a bounding box encompassing subsection of the "Interval History:" section, a bounding box encompassing the "Medications:" section header, a bounding box encompassing subsection of the "Medications:" section, a bounding box encompassing the "Allergies:" section header, a bounding box encompassing subsection of the "Allergies:" section, and a bounding box encompassing the "Oncology History:" section header.

Continuing with the example, sectionizer 120 provides, as input to visual model 125, image 300. Based on image 300, visual model 125 determines, as output, a set of sections in the document that are predicted to be section headers in the document. FIG. 4 illustrates candidate section headers in the example document illustrated in FIG. 3 after being processed by the visual model of the sectionizer illustrated in FIG. 1 according to some embodiments. As shown, in this example, visual model 125 has predicted sections 405-440 to be section headers in the document.

Figure 2:
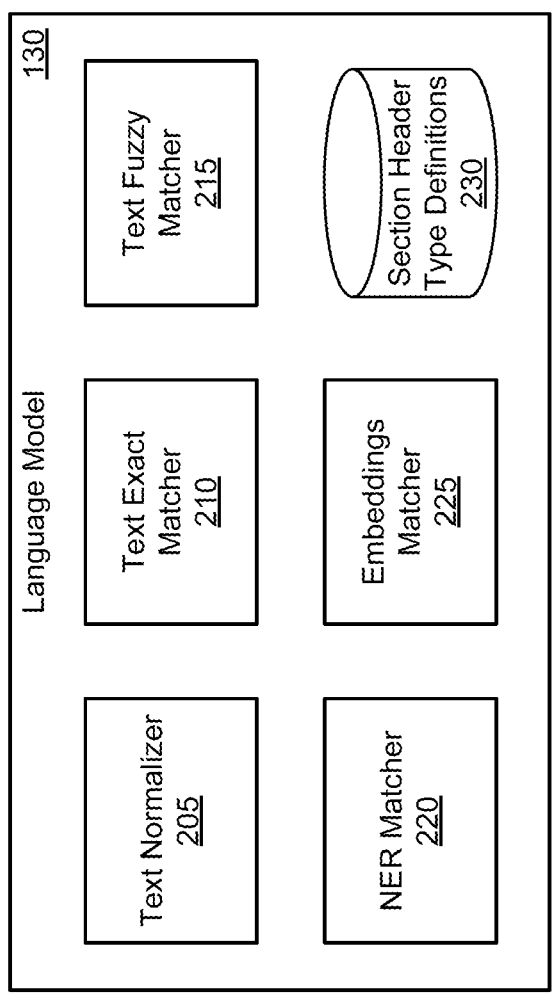
FIG. 2 illustrates a language model according to some embodiments.

Returning to FIG. 1, language model 130 is configured to determine the type of section headers in documents. For instance, language model 130 can receive from visual model 125 the dimensions and locations of the detected sections in the document, the type of the sections, and the recognized text in the sections. After receiving them, language model 130 uses NLP algorithms to analyze text in each candidate section header and determine a type of the candidate section header. FIG. 2 illustrates an example architecture of language model 130 according to some embodiments. As illustrated in FIG. 2, language model 130 includes text normalizer 205, text exact matcher 210, text fuzzy matcher 215, named-entity recognition (NER) matcher 220, embeddings matcher 225, and section header type definitions storage 230.

Figure 5:
FIG. 5 illustrates an example of a dictionary of section header type definitions according to some embodiments.

Section header type definitions storage 230 stores definitions of section header types. In some embodiments, a section header type definition includes a set of terms associated with the section header type. FIG. 5 illustrates an example of a dictionary 500 of section header type definitions according to some embodiments. As shown, dictionary 500 includes several definitions of section header types. Specifically, FIG. 5 shows that dictionary 500 includes a definition for a "Medications" section header type, a definition for a "Vitals" section header type, a definition for an "Allergies" section header type, a definition for a "Diagnoses" section header type, and a definition for a "Demographics" section header type, among other section header type definitions. Each section header type definition includes a set of terms associated with the section header type. For instance, the "Medications" section header type definition includes the terms "medication," "current medication," "prescription," and "[ner_med]." As another example, the "Allergies" section header type definition includes the terms "allergy," "allergic reaction," and "sensitivity."

Returning to FIG. 2, text normalizer 205 may perform text normalization operations on text. For example, before processing recognized text in a section header, language model 130 may use text normalizer 205 to normalize the recognized text. Examples of text normalization operations can include reducing plural nouns to singular nouns, removing capitalizations, removing diacritical marks, removing punctuation (e.g., question marks, exclamation marks, etc.), replacing sequences of whitespace characters with a single space character, etc. After the recognized text in a section header is normalized, text normalizer 205 sends the normalized text to text exact matcher 210.

Text exact matcher 210 can determine a type for a section header based on exact matches of text. For instance, when text exact matcher 210 receives from text normalizer 205 recognized text in a section header that has been normalized, text exact matcher 210 iterates through the terms included in each of the section header type definitions in dictionary 500 to determine whether the recognized text in the section header exactly matches a term specified in one of the section header type definitions. If so, text exact matcher 210 calculates a confidence score based on the match and determines the section header as being the type of section header defined by the section header type definition that has the matching term. If not, text exact matcher 210 sends the recognized text to text fuzzy matcher 215.

Text fuzzy matcher 215 is responsible for determining a type for a section header based on fuzzy matches of text. For example, upon receiving recognized text in a section header from text exact matcher 210, text fuzzy matcher 215 iterates through the terms included in each of the section header type definitions in dictionary 500 and uses a fuzzy matching algorithm to determine whether the recognized text in the section header matches a term specified in one of the section header type definitions. In some embodiments, the fuzzy matching algorithm determines a similarity score that represents the similarity between two terms with a lower similarity score indicating a lower similarity and a higher similarity score indicating a higher similarity. In some such embodiments, text fuzzy matcher 215 determines a similarity based on a Levenshtein distance metric. Other string distance metrics may be used in different embodiments. If the similarity score is greater than a defined threshold score, text fuzzy matcher 215 determines that the two terms match. If text fuzzy matcher 215 determines that the recognized text matches a term in a section header type definition, text fuzzy matcher 215 calculates a confidence score based on the match and determines the section header as being the type of section header defined by the section header type definition that has the matching term. Otherwise, text fuzzy matcher 215 sends the recognized text to NER matcher 220.

NER matcher 220 is configured to determine a type for a section header based on an NER algorithm. For instance, once NER matcher 220 receives recognized text in a section header from text fuzzy matcher 215, NER matcher 220 applies an NER algorithm to the recognized text to determine entities in the recognized text. Next, NER matcher 220 iterates through the terms included in each of the section header type definitions in dictionary 500 determines whether a determined entity matches a term specified in one of the section header type definitions. If so, NER matcher 220 calculates a confidence score based on the match and determines the section header as being the type of section header defined by the section header type definition that has the matching term. If not, NER matcher 220 sends the recognized text to embeddings matcher 225.

Embeddings matcher 225 may determine a type for a section header based on embeddings of text. For example, when embeddings matcher 225 receives from NER matcher 220 recognized text in a section header, embeddings matcher 210 determines an embedding for the recognized text in the section header. Then, embeddings matcher 225 iterates through the terms included in each of the section header type definitions in dictionary 500 and determines an embedding for each term based on words in the term. Techniques for determining embeddings for terms of one or more words are described in U.S. patent application Ser. No. 16/565,250, filed Sep. 9, 2019, which is incorporated herein by reference in its entirety. Next, embeddings matcher 225 determines whether the recognized text in the section header is matches a term specified in one of the section header type definitions based on the embedding for the recognized text and the embedding for term. In some embodiments, embeddings matcher 225 makes such a determination by calculating a vector distance (e.g., a cosine similarity) between the embedding for the recognized text and the embedding for term and determining whether the vector distance is greater than a defined threshold distance. If so, embeddings matcher 225 determines that the recognized text in the section header matches the term specified in the section header type definition, calculates a confidence score based on the match, and determines the section header as being the type of section header defined by the section header type definition that has the matching term. Otherwise, language model 130 determines that the section header is not a type of section header defined by dictionary 500.

After language model 130 processes the set of candidate section headers detected by visual model 125, sectionizer 120 determines total confidence scores for the set of candidate section headers based on the confidence scores determined by visual model 125 and the confidence scores determined by language model 130. In some embodiments, sectionizer 120 determines a total confidence score for a candidate section header by calculating the product of (i.e. multiplying) the confidence score determined for the section header by visual model 125 and the confidence score determined for the section header by language model 130. Finally, sectionizer 120 sends data manager 110 the information associated with the detected section headers in the document. In some embodiments, information associated with a detected section header in a document includes the type of the section header, a total confidence score, the text in the section header used to determine its type (e.g., the normalized version of the recognized text in the section header), and the NLP component used to predict the type of the section header (e.g., exact text matcher, fuzzy text matcher, NER matcher, or embeddings matcher). In some embodiments, sectionizer 120 sets all values for a detected section header to NULL if language model 130 determined that the section header is not a type of section header defined by dictionary 500 or the total confidence score of the section header is less than a defined threshold confidence score.

FIG. 6 illustrates the example document illustrated in FIG. 4 after being processed by the sectionizer illustrated in FIG. 1 according to some embodiments. Specifically, for this example, language model 130 has completed processing candidate section headers 405-440 and sectionizer 120 has determined total confidence scores for candidate section headers 405-440. FIG. 6 also shows, for each of the candidate section headers 420, 430, 435, and 440, the predicted type of the section header, a total confidence score, and the NLP component used to predict the type of the section header. For candidate section headers 405-415 and 425, "Null" values as shown because either the total confidence score for the section header was less than a defined threshold score or language model 130 did not determine a type for the section header.

Figure 7:
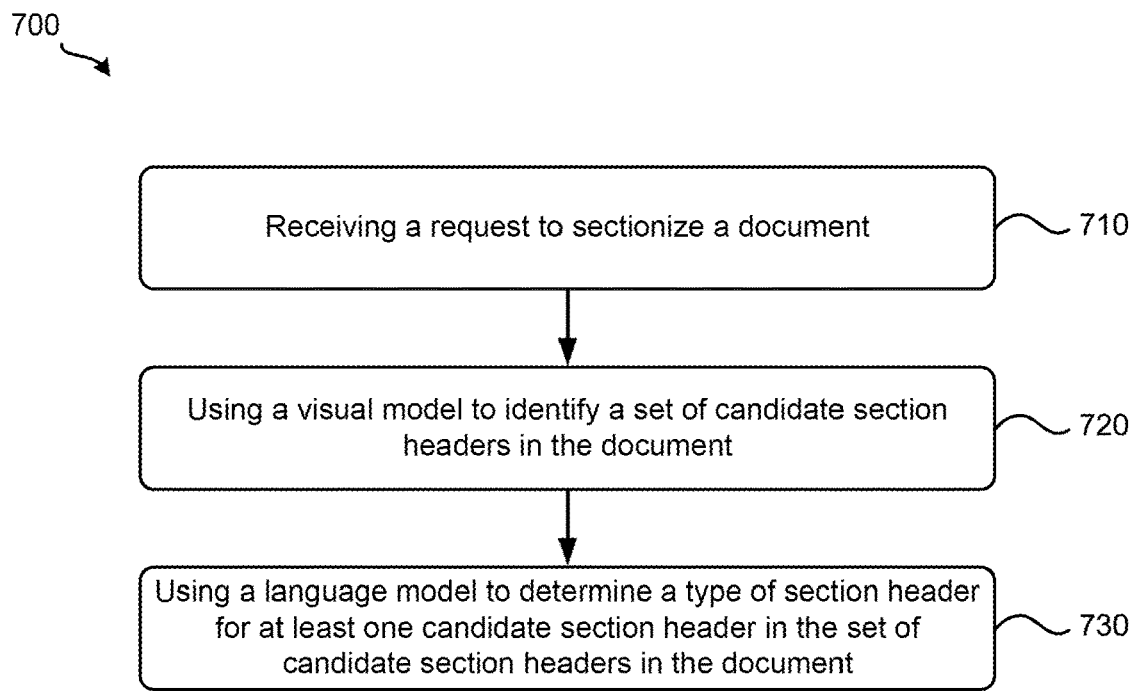
FIG. 7 illustrates a process for sectionizing a document according to some embodiments.

FIG. 7 illustrates a process 700 for sectionizing a document according to some embodiments. In some embodiments, sectionizer 120 performs process 700. Process 700 begins by receiving, at 710, a request to determine sectionize a document. Referring to FIGS. 1 and 3 as an example, sectionizer 120 may receive from data manager 110 a request to sectionize the document shown in FIG. 3.

Next, process 700 uses, at 720, a visual model to identify a set of candidate section headers in the document. Referring to FIGS. 1 and 4 as an example, sectionizer 120 can use visual model 125 to identify a set of candidate section headers 405-440 in the document.

Finally, process 700 uses, at 730, a language model to determine a type of section header for at least one section header in the set of candidate section headers in the document. Referring to FIGS. 1, 2, and 6 as an example, sectionizer 120 uses language model 130 to determine a type of section header for section headers 420, 430, 435, and 440. Language model 130 does not determine a type of section header for section headers 405-415 and 425 because either the total confidence score for the section header was less than a defined threshold score or language model 130 did not determine a type for the section header.

4. Data Anonymizer

Returning to FIG. 1, data anonymizer 135 is configured to anonymize data in documents. As illustrated in FIG. 1, data anonymizer 135 includes visual model 140 and language model 145. Visual model 140 is a visual model configured to detect candidate confidential sections in documents that data anonymizer 135 retrieves from trained visual models storage 155. Upon receiving from data manager 110 a request to anonymize data in the document, a set of images of the document, and information associated with recognized text in the document, data anonymizer 135 provides, as input to visual model 140, the set of images. Based on the set of images, visual model 140 determines, as output, a set of sections in the document that are predicted to contain collections of confidential data. For each determined section, visual model 140 determines the dimensions and location of the section in the document, the type of the section as being a confidential section, and a confidence score of prediction. Next, visual model 140 sends the set of candidate confidential sections (e.g., the dimensions and locations of the detected sections in the document, the type of the sections, and the recognized text in the sections) to language model 145 for further processing.

FIG. 8 illustrates an example image 800 of a document according to some embodiments. Here, image 800 will be used an example of an image of a document that data anonymizer 135 processes to anonymizer data in the document. As illustrated, image 800 of the document includes several sections. In particular, image 800 includes section containing information about a doctor, a section containing a collection of personal information, which includes some confidential data, about a patient, a summary section, and a test results section.

In this example, data anonymizer 135 receives from data manager 110 a request to anonymizer data in a document, image 800 of the document, and information associated with recognized text in the document. The information associated with recognized text in the document includes the recognized text itself (e.g., a string of text) and the dimensions and location of a bounding box encompassing the recognized text in the document. For this example, the information associated with recognized text in the document includes the dimensions and locations of a bounding box encompassing the section containing information about a doctor, a bounding box encompassing the section containing a collection of personal information about a patient, a bounding box encompassing the summary section header, a bounding box encompassing the summary section, a bounding box encompassing the test results section, and a bounding box encompassing the test results section.

Continuing with the example, data anonymizer 135 provides, as input to visual model 140, image 800. Based on the set of images, visual model 140 determines, as output, a set of sections in the document that are predicted to contain collections of confidential data. FIG. 9 illustrates candidate confidential sections in the example document illustrated in FIG. 8 after being processed by the visual model of the data anonymizer illustrated in FIG. 1 according to some embodiments. As shown, visual model 140 has predicted section 805 to be a confidential section in the document in this example.

Returning to FIG. 1, language model 145 is configured to identify confidential data within the candidate confidential sections. For example, language model 145 may receive from visual model 140 the dimensions and locations of the detected sections in the document, the type of the sections, and the recognized text in the sections. After receiving this data, language model 145 can identify confidential data in each candidate confidential section using a variety of different techniques. For example, in some embodiments, language model 145 validates whether the candidate confidential section contains confidential data such as, for example, a name, an ID, a driver's license number, a passport number, an age, a social security number (SSN), an ethnicity, a birthdate, a gender, financial information, etc. In some embodiments, language model 145 validates such data using a technique for determining key value pairs for confidential data. Next, language model 145 extracts such data, parses it, and then organizes it in a data structure.

In some embodiments, language model 145 can extract key-value pairs from the data by using a defined list of keys, parsing through the data to look for any keys that match terms in the data, and then determining the value for each key found in the data. For example, assume the defined list of keys include "patient name" and the data contains the phrase "Patient Name: Jane Doe." In this example, language model 145 sees that the key "patient name" matches the "Patient Name" terms in the phrase (after normalization of the phrase). Language model 145 determines a key-value pair where the key is "patient name" and the value is "Jane Doe." Once language model 145 has identified key-value pairs in the data, language model 145 may parse the value portion of the key-value pairs to attributes in the value portion of the key-value pairs. Continuing with the example, language model 145 parses the value "Jane Doe" of the example key-value pair and determines that "Jane" is a first name attribute and "Doe" is a last name attribute. After confidential data is extracted from candidate confidential sections in the document, data anonymizer 135 analyzes the document to identify references in the document to the extracted confidential data. In some embodiments, data anonymizer 135 uses a fuzzy matching algorithm to identify such references in the document. Then, data anonymizer 135 redacts confidential data identified in the document.

FIG. 10 illustrates the example document illustrated in FIG. 9 after being processed by the data anonymizer illustrated in FIG. 1 according to some embodiments. In particular, language model 145 has completed processing candidate confidential section 805 and data anonymizer 135 has redacted confidential data in the document. As shown in FIG. 10, candidate confidential section 805 has been redacted, as indicated by a blackout of candidate confidential section 805. In addition, references to "Mrs. Doe" and "Jane" have also been redacted, as indicated by blackouts of those terms in the summary section and the test results section.

Figure 11:
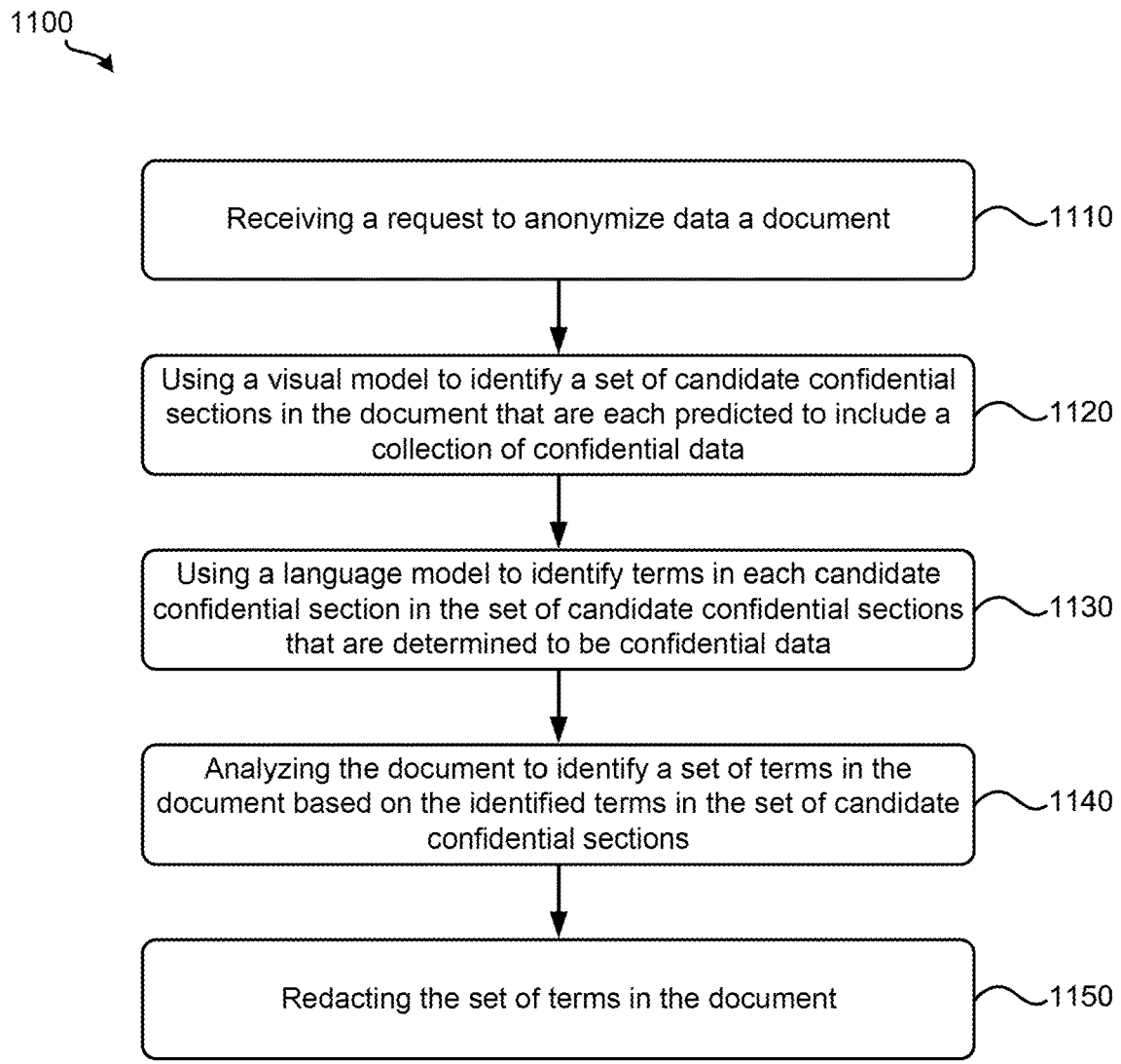
FIG. 11 illustrates a process for anonymizing data according to some embodiments.

FIG. 11 illustrates a process 1100 for anonymizing data according to some embodiments. In some embodiments, data anonymizer performs process 1100. Process 1100 starts by receiving, at 1110, a request to anonymize data in a document. Referring to FIGS. 1 and 8 as an example, data anonymizer 135 can receive from data manager 110 a request to anonymizer data in the document shown in FIG. 8.

Next, process 1100 uses, at 1120, a visual model to identify a set of candidate confidential sections in the document that are each predicted to include a collection of confidential data. Referring to FIGS. 1 and 9 as an example, data anonymizer 135 may use visual model 140 to identify candidate confidential section 805 in the document.

Process 1100 then uses, at 1130, a language model to identify terms in each candidate confidential section in the set of candidate confidential sections that are determined to be confidential data. Referring to FIGS. 1 and 9 as an example, data anonymizer 135 uses language model 145 to identify the terms "Jane Doe," "03/02/75," "56559873," "F," and "Asian" as being confidential data.

After operation 1130, process 1100 analyzes, at 1140, the document to identify a set of terms in the document based on the identified terms in the set of candidate confidential sections. Referring to FIGS. 1 and 9 as an example, data anonymizer 135 analyzes the document shown in FIG. 9 to identify terms in the document that reference the terms in candidate confidential section 805 identified as being confidential data. In this example, data anonymizer 135 identifies the terms "Mrs. Doe" and "Jane" in the summary section and test results section of the document as referencing confidential data in candidate confidential section 805.

Finally, process 1100 redacts, at 1150, the set of terms in the document. Referring to FIGS. 1 and 10 as an example, data anonymizer 135 redacts candidate confidential section 805 has been redacted. Also, references to "Mrs. Doe" and "Jane" in the summary section and the test results section have been redacted.

5. Example Systems

Figure 12:
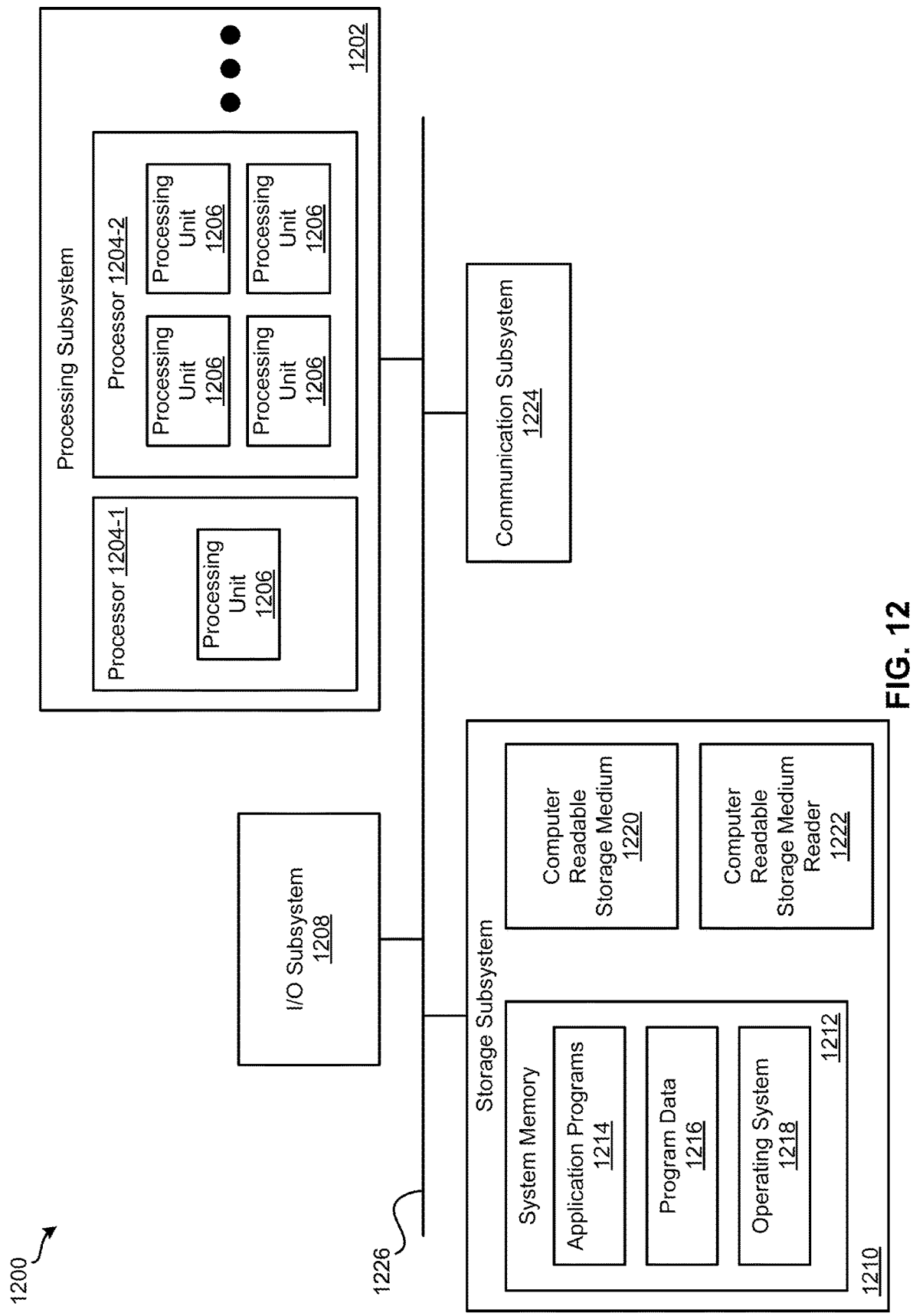
FIG. 12 illustrates an exemplary computer system, in which various embodiments may be implemented.

FIG. 12 illustrates an exemplary computer system 1200 for implementing various embodiments described above. For example, computer system 1200 may be used to implement client device 105 and document processing system 100. Computer system 1200 may be a desktop computer, a laptop, a server computer, or any other type of computer system or combination thereof. Some or all elements of data manager 110, visual manager 115, sectionizer 120, data anonymizer 135, or combinations thereof can be included or implemented in computer system 1200. In addition, computer system 1200 can implement many of the operations, methods, and/or processes described above (e.g., process 700 and process 1100). As shown in FIG. 12, computer system 1200 includes processing subsystem 1202, which communicates, via bus subsystem 1226, with input/output (I/O) subsystem 1208, storage subsystem 1210 and communication subsystem 1224.

Bus subsystem 1226 is configured to facilitate communication among the various components and subsystems of computer system 1200. While bus subsystem 1226 is illustrated in FIG. 12 as a single bus, one of ordinary skill in the art will understand that bus subsystem 1226 may be implemented as multiple buses. Bus subsystem 1226 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1202, which can be implemented as one or more integrated circuits (e.g., a conventional microprocessor or microcontroller), controls the operation of computer system 1200. Processing subsystem 1202 may include one or more processors 1204. Each processor 1204 may include one processing unit 1206 (e.g., a single core processor such as processor 1204-1) or several processing units 1206 (e.g., a multicore processor such as processor 1204-2). In some embodiments, processors 1204 of processing subsystem 1202 may be implemented as independent processors while, in other embodiments, processors 1204 of processing subsystem 1202 may be implemented as multiple processors integrate into a single chip or multiple chips. Still, in some embodiments, processors 1204 of processing subsystem 1202 may be implemented as a combination of independent processors and multiple processors integrated into a single chip or multiple chips.

In some embodiments, processing subsystem 1202 can execute a variety of programs or processes in response to program code and can maintain multiple concurrently executing programs or processes. At any given time, some or all of the program code to be executed can reside in processing subsystem 1202 and/or in storage subsystem 1210. Through suitable programming, processing subsystem 1202 can provide various functionalities, such as the functionalities described above by reference to process 700, process 1100, etc.

I/O subsystem 1208 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1200 to a user or another device (e.g., a printer).

As illustrated in FIG. 12, storage subsystem 1210 includes system memory 1212, computer-readable storage medium 1220, and computer-readable storage medium reader 1222. System memory 1212 may be configured to store software in the form of program instructions that are loadable and executable by processing subsystem 1202 as well as data generated during the execution of program instructions. In some embodiments, system memory 1212 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1212 may include different types of memory, such as static random access memory (SRAM) and/or dynamic random access memory (DRAM). System memory 1212 may include a basic input/output system (BIOS), in some embodiments, that is configured to store basic routines to facilitate transferring information between elements within computer system 1200 (e.g., during start-up). Such a BIOS may be stored in ROM (e.g., a ROM chip), flash memory, or any other type of memory that may be configured to store the BIOS.

As shown in FIG. 12, system memory 1212 includes application programs 1214, program data 1216, and operating system (OS) 1218. OS 1218 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1220 may be a non-transitory computer-readable medium configured to store software (e.g., programs, code modules, data constructs, instructions, etc.). Many of the components (e.g., data manager 110, visual manager 115, sectionizer 120, and data anonymizer 135) and/or processes (e.g., process 700 and process 1100) described above may be implemented as software that when executed by a processor or processing unit (e.g., a processor or processing unit of processing subsystem 1202) performs the operations of such components and/or processes. Storage subsystem 1210 may also store data used for, or generated during, the execution of the software.

Storage subsystem 1210 may also include computer-readable storage medium reader 1222 that is configured to communicate with computer-readable storage medium 1220. Together and, optionally, in combination with system memory 1212, computer-readable storage medium 1220 may comprehensively represent remote, local, fixed, and/or removable storage devices plus storage media for temporarily and/or more permanently containing, storing, transmitting, and retrieving computer-readable information.

Computer-readable storage medium 1220 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1224 serves as an interface for receiving data from, and transmitting data to, other devices, computer systems, and networks. For example, communication subsystem 1224 may allow computer system 1200 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1224 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1224 may provide components configured for wired communication (e.g., Ethernet) in addition to or instead of components configured for wireless communication.

One of ordinary skill in the art will realize that the architecture shown in FIG. 12 is only an example architecture of computer system 1200, and that computer system 1200 may have additional or fewer components than shown, or a different configuration of components. The various components shown in FIG. 12 may be implemented in hardware, software, firmware or any combination thereof, including one or more signal processing and/or application specific integrated circuits.

Figure 13:
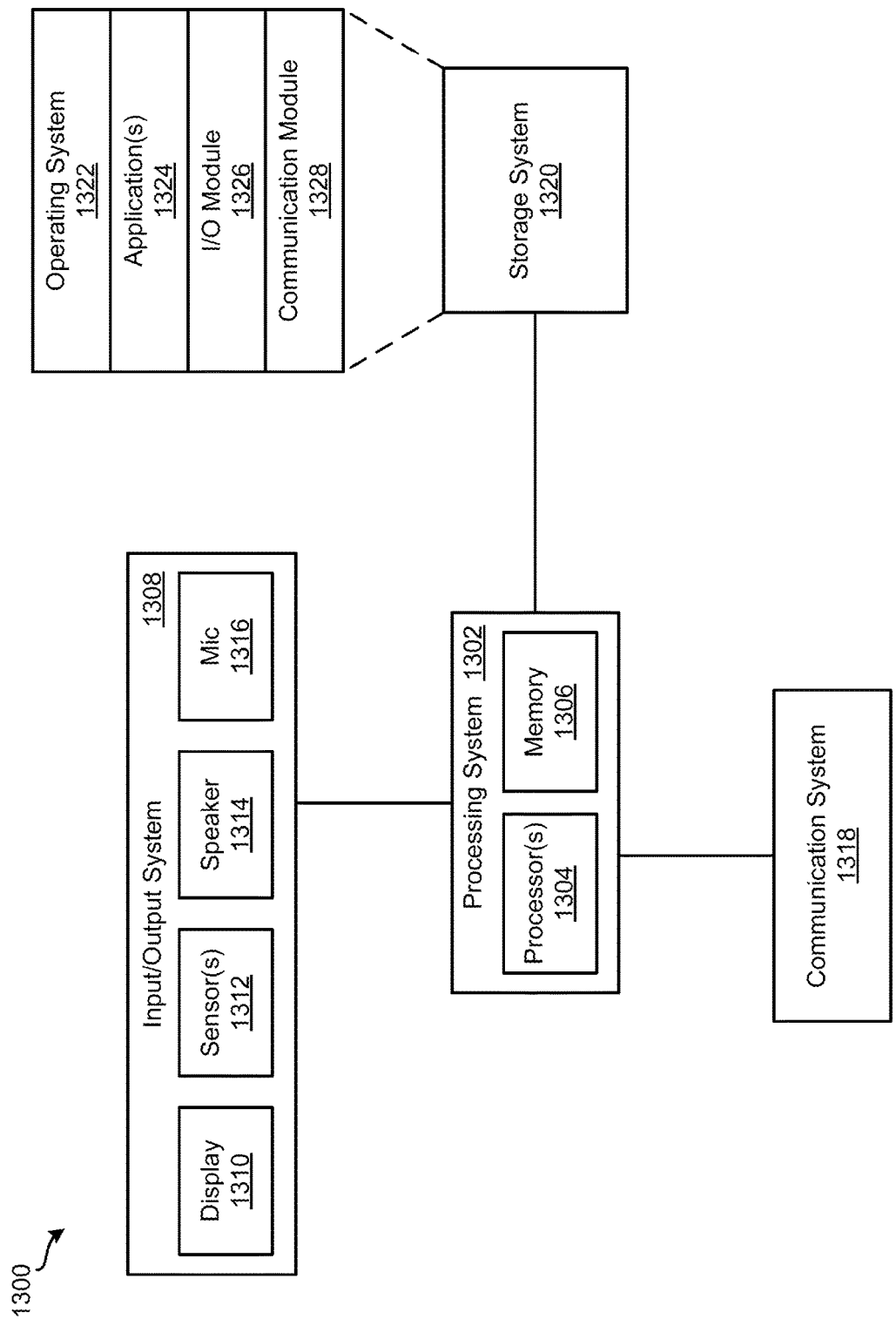
FIG. 13 illustrates an exemplary computing device, in which various embodiments may be implemented.

FIG. 13 illustrates an exemplary computing device 1300 for implementing various embodiments described above. For example, computing device 1300 may be used to implement client device 105. Computing device 1300 may be a cellphone, a smartphone, a wearable device, an activity tracker or manager, a tablet, a personal digital assistant (PDA), a media player, or any other type of mobile computing device or combination thereof. As shown in FIG. 13, computing device 1300 includes processing system 1302, input/output (I/O) system 1308, communication system 1318, and storage system 1320. These components may be coupled by one or more communication buses or signal lines.

Processing system 1302, which can be implemented as one or more integrated circuits (e.g., a conventional microprocessor or microcontroller), controls the operation of computing device 1300. As shown, processing system 1302 includes one or more processors 1304 and memory 1306. Processors 1304 are configured to run or execute various software and/or sets of instructions stored in memory 1306 to perform various functions for computing device 1300 and to process data.

Each processor of processors 1304 may include one processing unit (e.g., a single core processor) or several processing units (e.g., a multicore processor). In some embodiments, processors 1304 of processing system 1302 may be implemented as independent processors while, in other embodiments, processors 1304 of processing system 1302 may be implemented as multiple processors integrate into a single chip. Still, in some embodiments, processors 1304 of processing system 1302 may be implemented as a combination of independent processors and multiple processors integrated into a single chip.

Memory 1306 may be configured to receive and store software (e.g., operating system 1322, applications 1324, I/O module 1326, communication module 1328, etc. from storage system 1320) in the form of program instructions that are loadable and executable by processors 1304 as well as data generated during the execution of program instructions. In some embodiments, memory 1306 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1308 is responsible for receiving input through various components and providing output through various components. As shown for this example, I/O system 1308 includes display 1310, one or more sensors 1312, speaker 1314, and microphone 1316. Display 1310 is configured to output visual information (e.g., a graphical user interface (GUI) generated and/or rendered by processors 1304). In some embodiments, display 1310 is a touch screen that is configured to also receive touch-based input. Display 1310 may be implemented using liquid crystal display (LCD) technology, light-emitting diode (LED) technology, organic LED (OLED) technology, organic electro luminescence (OEL) technology, or any other type of display technologies. Sensors 1312 may include any number of different types of sensors for measuring a physical quantity (e.g., temperature, force, pressure, acceleration, orientation, light, radiation, etc.). Speaker 1314 is configured to output audio information and microphone 1316 is configured to receive audio input. One of ordinary skill in the art will appreciate that I/O system 1308 may include any number of additional, fewer, and/or different components. For instance, I/O system 1308 may include a keypad or keyboard for receiving input, a port for transmitting data, receiving data and/or power, and/or communicating with another device or component, an image capture component for capturing photos and/or videos, etc.

Communication system 1318 serves as an interface for receiving data from, and transmitting data to, other devices, computer systems, and networks. For example, communication system 1318 may allow computing device 1300 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1318 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1318 may provide components configured for wired communication (e.g., Ethernet) in addition to or instead of components configured for wireless communication.

Storage system 1320 handles the storage and management of data for computing device 1300. Storage system 1320 may be implemented by one or more non-transitory machine-readable mediums that are configured to store software (e.g., programs, code modules, data constructs, instructions, etc.) and store data used for, or generated during, the execution of the software.

In this example, storage system 1320 includes operating system 1322, one or more applications 1324, I/O module 1326, and communication module 1328. Operating system 1322 includes various procedures, sets of instructions, software components and/or drivers for controlling and managing general system tasks (e.g., memory management, storage device control, power management, etc.) and facilitates communication between various hardware and software components. Operating system 1322 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1324 can include any number of different applications installed on computing device 1300. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1326 manages information received via input components (e.g., display 1310, sensors 1312, and microphone 1316) and information to be outputted via output components (e.g., display 1310 and speaker 1314). Communication module 1328 facilitates communication with other devices via communication system 1318 and includes various software components for handling data received from communication system 1318.

One of ordinary skill in the art will realize that the architecture shown in FIG. 13 is only an example architecture of computing device 1300, and that computing device 1300 may have additional or fewer components than shown, or a different configuration of components. The various components shown in FIG. 13 may be implemented in hardware, software, firmware or any combination thereof, including one or more signal processing and/or application specific integrated circuits.

Figure 14:
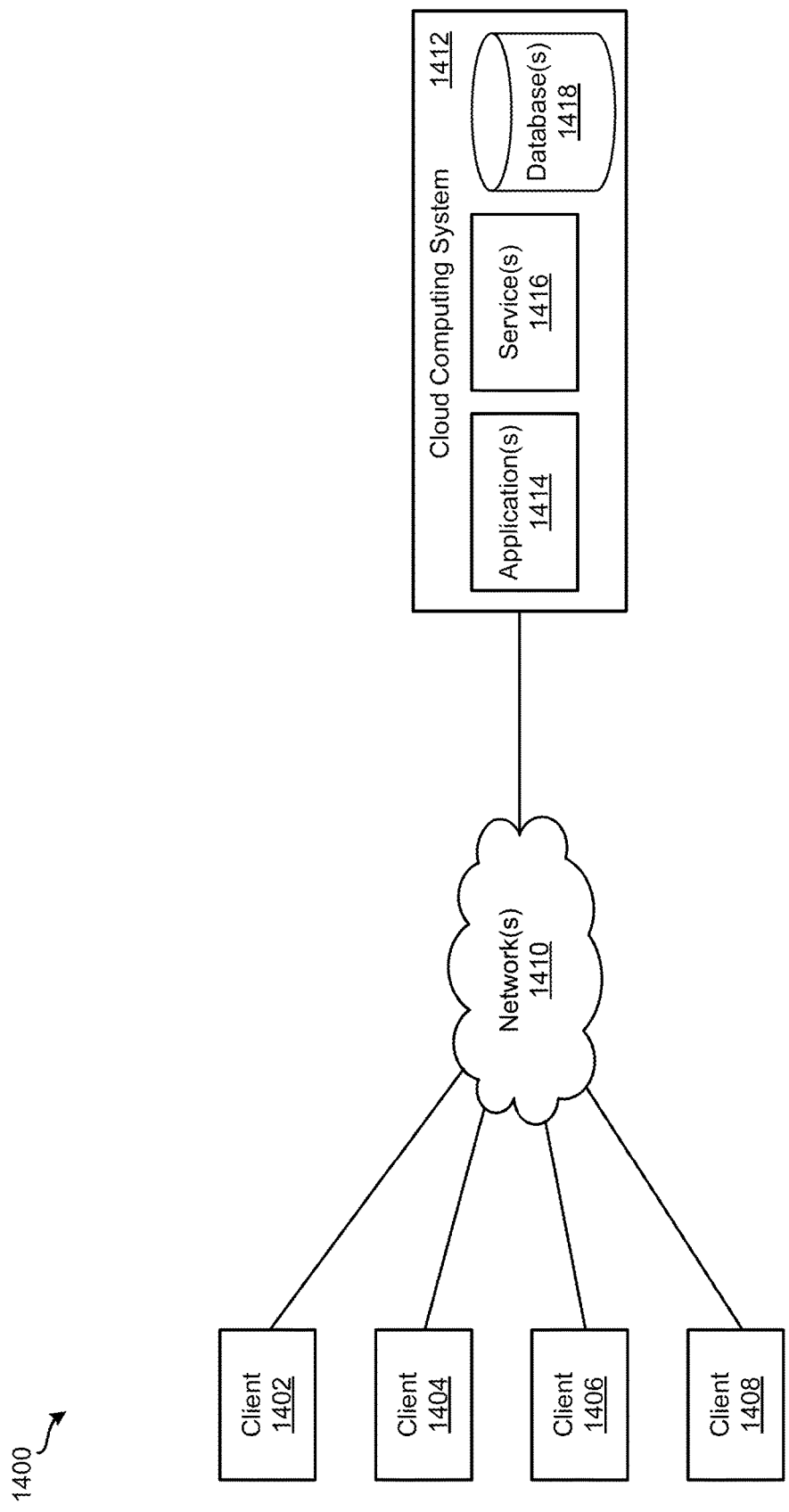
FIG. 14 illustrates an exemplary system, in which various embodiments may be implemented.

FIG. 14 illustrates an exemplary system 1400 for implementing various embodiments described above. For example, any one of client devices 1402-1408 may be used to implement client device 105 and cloud computing system 1412 may be used to implement document processing system 100. As shown, system 1400 includes client devices 1402-1408, one or more networks 1410, and cloud computing system 1412. Cloud computing system 1412 is configured to provide resources and data to client devices 1402-1408 via networks 1410. In some embodiments, cloud computing system 1400 provides resources to any number of different users (e.g., customers, tenants, organizations, etc.). Cloud computing system 1412 may be implemented by one or more computer systems (e.g., servers), virtual machines operating on a computer system, or a combination thereof.

As shown, cloud computing system 1412 includes one or more applications 1414, one or more services 1416, and one or more databases 1418. Cloud computing system 1400 may provide applications 1414, services 1416, and databases 1418 to any number of different customers in a self-service, subscription-based, elastically scalable, reliable, highly available, and secure manner.

In some embodiments, cloud computing system 1400 may be adapted to automatically provision, manage, and track a customer's subscriptions to services offered by cloud computing system 1400. Cloud computing system 1400 may provide cloud services via different deployment models. For example, cloud services may be provided under a public cloud model in which cloud computing system 1400 is owned by an organization selling cloud services and the cloud services are made available to the general public or different industry enterprises. As another example, cloud services may be provided under a private cloud model in which cloud computing system 1400 is operated solely for a single organization and may provide cloud services for one or more entities within the organization. The cloud services may also be provided under a community cloud model in which cloud computing system 1400 and the cloud services provided by cloud computing system 1400 are shared by several organizations in a related community. The cloud services may also be provided under a hybrid cloud model, which is a combination of two or more of the aforementioned different models.

In some instances, any one of applications 1414, services 1416, and databases 1418 made available to client devices 1402-1408 via networks 1410 from cloud computing system 1400 is referred to as a "cloud service." Typically, servers and systems that make up cloud computing system 1400 are different from the on-premises servers and systems of a customer. For example, cloud computing system 1400 may host an application and a user of one of client devices 1402-1408 may order and use the application via networks 1410.

Applications 1414 may include software applications that are configured to execute on cloud computing system 1412 (e.g., a computer system or a virtual machine operating on a computer system) and be accessed, controlled, managed, etc. via client devices 1402-1408. In some embodiments, applications 1414 may include server applications and/or mid-tier applications (e.g., HTTP (hypertext transport protocol) server applications, FTP (file transfer protocol) server applications, CGI (common gateway interface) server applications, JAVA server applications, etc.). Services 1416 are software components, modules, application, etc. that are configured to execute on cloud computing system 1412 and provide functionalities to client devices 1402-1408 via networks 1410. Services 1416 may be web-based services or on-demand cloud services.

Databases 1418 are configured to store and/or manage data that is accessed by applications 1414, services 1416, and/or client devices 1402-1408. For instance, documents storage 150, trained visual models storage 155, and section header type definitions storage 230 may be stored in databases 1418. Databases 1418 may reside on a non-transitory storage medium local to (and/or resident in) cloud computing system 1412, in a storage-area network (SAN), on a non-transitory storage medium local located remotely from cloud computing system 1412. In some embodiments, databases 1418 may include relational databases that are managed by a relational database management system (RDBMS). Databases 1418 may be a column-oriented databases, row-oriented databases, or a combination thereof. In some embodiments, some or all of databases 1418 are in-memory databases. That is, in some such embodiments, data for databases 1418 are stored and managed in memory (e.g., random access memory (RAM)).

Client devices 1402-1408 are configured to execute and operate a client application (e.g., a web browser, a proprietary client application, etc.) that communicates with applications 1414, services 1416, and/or databases 1418 via networks 1410. This way, client devices 1402-1408 may access the various functionalities provided by applications 1414, services 1416, and databases 1418 while applications 1414, services 1416, and databases 1418 are operating (e.g., hosted) on cloud computing system 1400. Client devices 1402-1408 may be computer system 1200 or computing device 1300, as described above by reference to FIGS. 12 and 13, respectively. Although system 1400 is shown with four client devices, any number of client devices may be supported.

Networks 1410 may be any type of network configured to facilitate data communications among client devices 1402-1408 and cloud computing system 1412 using any of a variety of network protocols. Networks 1410 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium comprising instructions stored thereon that, when executed by a processor, cause the processor to:
   receive a request to anonymize data in a document;
   identify, using a first visual model, a set of candidate confidential sections in the document that are each predicted to include a collection of confidential data;
   identify, using a first language model, confidential data in each candidate confidential section of the set of candidate confidential sections;
   validate, using the first language model, that the set of candidate confidential sections comprises the collection of confidential data;
   identify data in the document based on the identified confidential data in the set of candidate confidential sections; and
   redact the data in the document, wherein the document is a document that has previously been sectionalized using a second visual model and a second language model.

2. The non-transitory machine-readable medium of claim 1, wherein the instructions that cause the processor to identify the set of candidate confidential sections further comprise instructions to:
   identify, using the first visual model, dimensions of bounding boxes encompassing text in the set of candidate confidential sections, locations of the bounding boxes in the document, and confidence scores corresponding to the bounding boxes.

3. The non-transitory machine-readable medium of claim 1, wherein the first visual model receives an image of the document as an input to identify the set of candidate confidential sections in the document.

4. The non-transitory machine-readable medium of claim 1, wherein the instructions to identify the confidential data in each candidate confidential section comprise instructions that cause the processor to identify, using the first language model, key-value pairs.

5. The non-transitory machine-readable medium of claim 1, wherein the instructions to identify the confidential data in each candidate confidential section comprise instructions that cause the processor to:
   extract the confidential data;
   parse the confidential data; and
   generate a data structure comprising the confidential data.

6. The non-transitory machine-readable medium of claim 1, wherein the instructions to identify data in the document comprise instructions to execute a fuzzy matching algorithm to identify one or more references to the confidential data in the document.

7. The non-transitory machine-readable medium of claim 1, further comprising instructions that cause the processor, prior to identifying a set of candidate confidential sections in the document, to sectionalize the document using the second visual model and the second language model.

8. A system comprising:
   a set of processing units; and
   a non-transitory machine-readable medium comprising instructions that, when executed by at least one processing unit in the set of processing units, cause the at least one processing unit to:
   receive a request to anonymize data in a document;
   identify, using a first visual model, a set of candidate confidential sections in the document that are each predicted to include a collection of confidential data;
   identify, using a first language model, confidential data in each candidate confidential section of the set of candidate confidential sections;
   validate, using the first language model, that the set of candidate confidential sections comprises the collection of confidential data;
   identify data in the document based on the identified confidential data in the set of candidate confidential sections; and
   redact the data in the document, wherein the document is a document that has previously been sectionalized using a second visual model and a second language model.

9. The system of claim 8, wherein the instructions that cause the at least one processing unit to identify the set of candidate confidential sections comprise instructions to:
   identify, using the first visual model, dimensions of bounding boxes encompassing text in the set of candidate confidential sections, locations of the bounding boxes in the document, and confidence scores corresponding to the bounding boxes.

10. The system of claim 8, wherein the first visual model receives an image of the document as an input to identify the set of candidate confidential sections in the document.

11. The system of claim 8, wherein the instructions to identify the confidential data in each candidate confidential section comprise instructions that cause the at least one processing unit to identify, using the first language model, key-value pairs.

12. The system of claim 8, wherein the instructions to identify the confidential data in each candidate confidential section comprise instructions that cause the at least one processing unit to:
   extract the confidential data;
   parse the confidential data; and
   generate a data structure comprising the confidential data.

13. The system of claim 8, wherein the instructions to identify data in the document comprise instructions to execute a fuzzy matching algorithm to identify one or more references to the confidential data in the document.

14. The system of claim 8, wherein the instructions further comprise instructions that cause the at least one processing unit, prior to identifying a set of candidate confidential sections in the document, to sectionalize the document using the second visual model and the second language model.

15. A method comprising:
   receiving, by a processor, a request to anonymize data in a document;
   identifying, using a first visual model implemented by the processor, a set of candidate confidential sections in the document that are each predicted to include a collection of confidential data;
   identifying, using a first language model implemented by the processor, confidential data in each candidate confidential section of the set of candidate confidential sections;
   validating, using the first language model, that the set of candidate confidential sections comprises the collection of confidential data;
   identifying, by the processor, data in the document based on the identified confidential data in the set of candidate confidential sections; and
   redacting the data in the document, wherein the document is a document that has previously been sectionalized using a second visual model and a second language model.

16. The method of claim 15, wherein the identifying the set of candidate confidential sections further comprises:
   identifying, using the first visual model implemented by the processor, dimensions of bounding boxes encompassing text in the set of candidate confidential sections, locations of the bounding boxes in the document, and confidence scores corresponding to the bounding boxes.

17. The method of claim 15, wherein the first visual model receives an image of the document as an input to identify the set of candidate confidential sections in the document.

18. The method of claim 15, wherein the identifying confidential data in each candidate confidential section comprises identifying, using the first language model implemented by the processor, key-value pairs.

19. The method of claim 15, wherein the identifying confidential data in each candidate confidential section comprises:
   extracting, by the processor, the confidential data;
   parsing, by the processor, the confidential data; and
   generating, by the processor, a data structure comprising the confidential data.

20. The method of claim 15, wherein the identifying data in the document uses a fuzzy matching algorithm to identify one or more references to the confidential data in the document.

21. The method of claim 15, further comprising, prior to the identifying a set of candidate confidential sections in the document, sectionalizing the document using the second visual model and the second language model.

* * * * *